US009428388B2

(12) United States Patent
Lakrout et al.

(10) Patent No.: US 9,428,388 B2
(45) Date of Patent: Aug. 30, 2016

(54) CARBON—CARBON COMPOSITES (71) Applicant: Blue Cube IP LLC, Midland, MI (US)

(72) Inventors: Hamed Lakrout, Lake Jackson, TX (US); Maurice J. Marks, Lake Jackson, TX (US); Ludovic Valette, Perrysburg, OH (US)

(73) Assignee: BLUE CUBE IP LLC, Midland, MI (US)

(*) Notice: Subject to any disclaimer, the term of this patent is extended or adjusted under 35 U.S.C. 154(b) by 0 days.

(21) Appl. No.: 14/391,717

(22) PCT Filed: May 17, 2013

(86) PCT No.: PCT/US2013/041560
§ 371 (c)(1),
(2) Date: Oct. 10, 2014

(87) PCT Pub. No.: WO2013/188049
PCT Pub. Date: Dec. 19, 2013

(65) Prior Publication Data
US 2015/0115195 A1 Apr. 30, 2015

Related U.S. Application Data (60) Provisional application No. 61/660,437, filed on Jun. 15, 2012.

(51) Int. Cl.
*C04B 35/52* (2006.01)
*C01B 31/02* (2006.01)
(Continued)

(52) U.S. Cl.
CPC ............ *C01B 31/02* (2013.01); *C04B 35/521* (2013.01); *C04B 35/522* (2013.01); *C04B 35/6269* (2013.01); *C04B 35/632* (2013.01); *C04B 35/63452* (2013.01); *C04B 35/83* (2013.01); *C08J 5/24* (2013.01); *C09K 5/14* (2013.01); *F16D 69/023* (2013.01); *C04B 2235/5256* (2013.01); *C04B 2235/612* (2013.01); *C04B 2235/616* (2013.01); *C04B 2235/6562* (2013.01); *C04B 2235/77* (2013.01); *C08J 2363/00* (2013.01)

(58) Field of Classification Search
USPC ................. 428/408; 264/603, 642
See application file for complete search history.

(56) References Cited

U.S. PATENT DOCUMENTS 4,024,226 A * 5/1977 Lersmacher ............ C03B 40/00
264/29.1
6,465,100 B1 * 10/2002 Johnson, III .......... C04B 35/634
428/408

FOREIGN PATENT DOCUMENTS

GB 1135816 * 12/1968
JP 29432/74 B2 8/1999

*Primary Examiner* — Archene Turner
(74) *Attorney, Agent, or Firm* — Polsinelli PC (57) ABSTRACT A process for preparing a carbon-carbon composite including the steps of: (a) providing a curable low viscosity aromatic epoxy resin liquid formulation, wherein the formulation has a neat viscosity of less than 10,000 mPa-s at 25° C. prior to adding optional components, prior to curing, and prior to carbonizing; and wherein the formulation being cured has a carbon yield of at least 35 wt % disregarding the weight of the carbon matrix and any optional components present in the composition; (b) contacting a carbon matrix with the formulation of step (a); (c) curing the contacted carbon matrix of step (b); and (d) carbonizing the cured carbon matrix of step (c) to form a carbon-carbon composite; and a carbon-carbon composite made by the process.

16 Claims, 3 Drawing Sheets (51) Int. Cl.
*C04B 35/83* (2006.01)
*F16D 69/02* (2006.01)
*C04B 35/626* (2006.01)
*C04B 35/632* (2006.01)
*C04B 35/634* (2006.01)
*C08J 5/24* (2006.01)
*C09K 5/14* (2006.01)

CARBON—CARBON COMPOSITES

FIELD

The present invention is related to a carbon-carbon composite and a process for preparing a carbon-carbon composite.

BACKGROUND

A number of applications require a structural conductive carbon-carbon composite article or part such as for example aerospace brake pads. Such a carbon-carbon composite material is typically made by densifying carbon fiber mat or carbon bulk block by densification techniques such as for example by: (1) "infiltration" of a vapor phase into the carbon matrix such as a carbon fiber mat; or (2) "impregnation" of a liquid phase composition into the carbon matrix to form a preform followed by curing the preform and then eventually pyrolyzing the cured preform to produce a carbon-carbon composite article.

The objective of densifying a carbon-carbon composite part, for instance densifying the part from 10 lbs/cubic feet to 20 lbs/cubic feet, is to obtain a high carbon content in the part and to increase certain properties of the part. For example, the thermal conductivity of the part and/or the structural strength (e.g., maximum compressibility) of the part can be increased when the carbon content of the part can be increased. In applications such as aerospace brake pads, the thermal conductivity of the brake pads is critical and the thermal conductivity of the brake pads has to be sufficient to disperse efficiently the heat generated by friction exerted by the pads. Non-uniformities or defects in the carbon-carbon composite part used for the brake pads may decrease the reliability of the part.

Heretofore, manufacturers of carbon-carbon composites using a liquid phase precursor and the impregnation method described above have been faced with two choices. The manufacturer can employ a low-viscosity liquid matrix-precursor to obtain good impregnation under pressure of the low-viscosity liquid matrix-precursor into a carbon matrix and filling most large pores of the carbon matrix completely. However, this method results in a small amount of a low-quality matrix due to the low molecular weight of the liquid precursor and poor pyrolysis efficiency.

Alternatively, the manufacturer can utilize a high-viscosity liquid matrix-precursor forced into a carbon matrix with higher pressure which results in a small amount of a better-quality matrix due to the higher molecular weight of the liquid precursor and good pyrolysis efficiency. However, on the down side, the high-viscosity liquid matrix-precursor of this method does a poor job of filling the porosity and will degrade composite properties resulting from the increased breakage of the carbon material such as carbon fibers.

Generally, uniform densification requires a low viscosity (typically, lower than 100 mPa-s) and a high carbon yield (typically, above 40 percent (%)) with a carbon backbone structure typically provided by knitted or woven carbon fibers. Liquid epoxies can be the source of carbon rich material with more than 40% carbon content in the epoxies' molecular structure; but generally, such epoxies cannot be used for densification without a solvent because of the epoxies' high viscosity. In addition, the liquid epoxies do not yield solid structural carbon because of the epoxies' loose physical network created by the epoxies' molecular chains.

Japanese Patent Publication No. 29432/74 discloses a method for producing a carbon-carbon composite which includes the steps of: (I) mixing (A) organic fibers, such as pitch fibers, having a hydrogen/carbon atomic ratio of from 0.25 to 0.8, determined by elemental analysis, and etheric oxygen content of 3% to 15%, a carbonization yield of at least 50% but not more than 92%, preferably at least 70%; a linear shrinkage at 1,000° C. of 4% to 25%; a diameter of not more than 40 microns; and a fiber length/diameter ratio of at least 5; and (B) an organic binder, such as a phenolic resin or furfural resin, having a carbonization yield of at least 10%; (II) pre-shaping the mixture; and (III) firing the precursor. However, the method described in the above reference suffers from several disadvantages including for example (1) the method does not employ an epoxy resin formulation, (2) the formulation uses a solvent, (3) the viscosity of the resin is high, and (3) the carbon yield of the resulting fired precursor is low (e.g., not more than 10%).

SUMMARY

The present invention is directed to a process for preparing a carbon-carbon composite starting from a solvent-free low viscosity curable liquid epoxy resin formulation. For example, one embodiment of the process for preparing a carbon-carbon composite includes the steps of:

(I) providing a curable low viscosity liquid carbon precursor formulation comprising (a) at least one aromatic epoxy resin; and (b)(i) at least one aromatic co-reactive curing agent, (b)(ii) at least one catalytic curing agent, or (b)(iii) a mixture thereof; wherein the liquid precursor composition has a neat viscosity of less than 10,000 mPa-s at 25° C. prior to adding optional components, prior to curing, and prior to carbonizing; and wherein the liquid precursor composition being cured has a carbon yield of at least 35 wt % as measured in the absence of optional components:

(II) contacting a carbon matrix with the curable low viscosity liquid carbon precursor formulation of step (I) to form a contacted carbon matrix;

(III) curing the formulation of step (I) contacted to the carbon matrix of step (II) to form a cured contacted carbon matrix (also referred to as a "green carbon-carbon composite"); wherein the cured formulation contacted to the carbon matrix has a carbon yield of at least 35 wt % as measured in the absence of optional components; and (IV) carbonizing the cured contacted carbon matrix of step (III) to form a carbon-carbon composite.

Another embodiment of the present invention is directed to a carbon-carbon composite prepared by the above process.

BRIEF DESCRIPTION OF THE DRAWINGS

For the purpose of illustrating the present invention, the drawings show a form of the present invention which is presently preferred. However, it should be understood that the present invention is not limited to the precise subject matter shown in the drawings.

DETAILED DESCRIPTION

"Densification" or "densifying" herein means increasing ratio weight by volume.

"Solvent-free" or "solvent-less" with reference to a formulation herein means the absence of any additional low viscosity diluents with a low boiling point in the formulation.

"Carbon-carbon composite" herein means a composite product resulting from the combination of at least two carbonaceous materials usually wherein one of the carbonaceous materials is a solid phase such as fibers or coal and wherein the other carbonaceous material is a diffuse phase such as a vaporized precursor or an infused liquid resin.

"Wetting" or "wetting ability" or "wettability" herein means affinity between a liquid and the surface of a substrate translating into the ability of the liquid to spread on the surface of the substrate.

"Porosity" here means lack of internal continuity of a piece of material.

In its broadest scope, a carbon-carbon composite of the present invention may be manufactured by curing and carbonizing a curable formulation to produce a carbon-carbon composite or article. Accordingly, in carrying out the process of the present invention, the first step is to prepare or provide a curable composition or formulation.

For example in one embodiment, the curable low viscosity liquid carbon precursor formulations useful in the present invention and the process for manufacturing such formulation may include for example the process and any of the formulations described in co-pending U.S. Provisional Patent Application No. 61/660,417.

In another embodiment, examples of the curable low viscosity liquid carbon precursor formulation useful in the present invention may include the curable compositions or formulations described in co-pending U.S. Provisional Patent Application Ser. No. 61/660,389; co-pending U.S. Provisional Patent Application Ser. No. 61/660,397; and co-pending U.S. Provisional Patent Application Ser. No. 61/660,403.

"Carbonizing", "carbonization" or "pyrolyzing" herein means removing a significant portion of non-carbon elements from a composition by heating the composition at a temperature of 10° C./minute from 25° C. to 1000° C. under an inert atmosphere such as nitrogen.

"Carbon yield" with reference to a cured composition herein means the percent weight remaining from a cured sample of a composition treated at 10° C./minute from 25° C. to 1000° C. under an inert atmosphere, such as nitrogen, disregarding the weight of the carbon matrix and any optional components present in the composition.

For example, the curable low viscosity liquid carbon precursor formulation useful for preparing a carbon-carbon composite includes (a) at least one aromatic epoxy resin; and (b)(i) at least one aromatic co-reactive curing agent, (b)(ii) at least one catalytic curing agent, or (b)(iii) a mixture thereof; wherein the liquid precursor composition has a neat viscosity of less than 10,000 mPa-s at 25° C. prior to adding optional components, prior to curing, and prior to carbonizing; and wherein the liquid precursor composition being cured has a carbon yield of at least 35 wt % as measured in the absence of optional components. In addition, the curable formulation useful in the present invention can be solvent-free.

The aromatic epoxy resin compound, component (a), useful in the curable liquid carbon precursor formulation can be one aromatic epoxy resin compound or a combination of two or more epoxy resin compounds, wherein at least one of the epoxy resin compounds is an aromatic epoxy resin. For example, one preferred embodiment of the aromatic epoxy resin useful in the present invention may be a divinylarene dioxide.

In one embodiment, the divinylarene dioxide useful in the curable liquid carbon precursor composition of the present invention may include any of the divinylarene dioxides described in U.S. patent application Ser. No. 13/133,510.

In another embodiment, the divinylarene dioxide useful in preparing the curable liquid carbon precursor composition of the present invention may include, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthalene, and tetrahydronaphthalene. Homologously bonded (substituted) benzenes may consist of biphenyl, and diphenylether.

The divinylarene dioxide used for preparing the formulations of the present invention may be illustrated generally by chemical Structures I-IV as follows:

In the above Structures I, II, III, and IV of the divinylarene dioxide useful in the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide useful in the present invention may be produced, for example, by the process described in U.S. Patent Provisional Application Ser. No. 61/141,457, filed Dec. 30, 2008, by Marks et al. In another embodiment, the divinylarene dioxides useful in the present invention are disclosed in, for example, U.S. Pat. No. 2,924,580.

In still another embodiment, the divinylarene dioxide useful in the present invention may include, for example, divinylbenzene dioxide (DVBDO), divinylnaphthalene dioxide, divinylbiphenyl dioxide, divinyldiphenylether dioxide, or mixtures thereof.

In one preferred embodiment of the present invention, the divinylarene dioxide used in the curable liquid carbon precursor composition of the present invention can be for example DVBDO. Divinylarene dioxides such as for example DVBDO are a class of diepoxides which have a relatively low liquid viscosity but a higher rigidity and crosslink density than conventional epoxy resins.

In another preferred embodiment, the divinylarene dioxide compound useful in the present invention includes, for example, a DVBDO as illustrated by the following chemical formula of Structure V:

Structure V

The chemical formula of the above DVBDO compound may be as follows: $C_{10}H_{10}O_2$; the molecular weight of the DVBDO is 162.2; and the elemental analysis of the DVBDO is: C, 74.06; H, 6.21; and O, 19.73 with an epoxide equivalent weight of 81 g/mol.

Structure VI below illustrates another embodiment of a preferred chemical structure of the DVBDO useful in the present invention:

Structure VI

Structure VII below illustrates still another embodiment of a preferred chemical structure of the DVBDO useful in the present invention:

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from 9:1 to 1:9 ratio of meta (Structure VI) to para (Structure VII) isomers. The present invention preferably includes as one embodiment a range of from 6:1 to 1:6 ratio of Structure VI to Structure VII, and in other embodiments the ratio of Structure VI to Structure VII may be from 4:1 to 1:4 or from 2:1 to 1:2.

In yet another embodiment of the present invention, the divinylarene dioxide may contain quantities (such as for example less than 20 wt %) of substituted arenes and/or arene oxides. The amount and structure of the substituted arenes and/or arene oxides mixed with a divinylarene dioxide composition depends on the process used in the preparation of the divinylarene precursor which is, in turn, used to prepare the divinylarene dioxide. For example, the divinylarene precursor such as divinylbenzene (DVB) can be prepared by the dehydrogenation of diethylbenzene (DEB), and the resultant product composition may contain quantities of ethylvinylbenzene (EVB) and DEB. During the dehydrogenation reaction of DEB, wherein an oxidant such as hydrogen peroxide, the EVB present in the reaction mixture can react with hydrogen peroxide to produce ethylvinylbenzene oxide while DEB remains unchanged. The presence of ethylvinylbenzene oxide and DEB in the divinylarene dioxide can increase the epoxide equivalent weight of the divinylarene dioxide to a value greater than that of a pure divinylarene dioxide compound.

In one embodiment, the divinylarene dioxide, (for example DVBDO) useful in the present invention comprises a low viscosity liquid epoxy resin. For example, the viscosity of the divinylarene dioxide used in the present invention ranges generally from 0.001 Pa-s to 0.1 Pa-s in one embodiment, from 0.01 Pa-s to 0.05 Pa-s in another embodiment, and from 0.01 Pa-s to 0.025 Pa-s in still another embodiment, at 25° C.

One advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from 6 to 10 rotational degrees of freedom in one embodiment, from 6 to 9 rotational degrees of freedom in another embodiment, and from 6 to 8 rotational degrees of freedom in still another embodiment.

The aromatic epoxy resin useful in the present invention curable liquid carbon precursor composition may include a wide variety of aromatic epoxy resins known in the art other than the divinylarene dioxide. The aromatic epoxy resin may be may be substituted or unsubstituted. The aromatic epoxy resin may be monomeric or polymeric. The aromatic epoxy resin may include a single aromatic epoxy resin or may include a combination of two or more aromatic epoxy resins.

For example, the aromatic epoxy resin useful in the present invention may include, one or more aromatic epoxy resin compounds described in Pham, H. Q. and Marks, M. J., *Epoxy Resins*, the Kirk-Othmer Encyclopedia of Chemical Technology; John Wiley & Sons, Inc.: online Dec. 4, 2004 and in the references therein; in Lee, H. and Neville, K., *Handbook of Epoxy Resins*, McGraw-Hill Book Company, New York, 1967, Chapter 2, pages 2-1 to 2-33, and in the references therein; May, C. A. Ed., *Epoxy Resins: Chemistry and Technology*, Marcel Dekker Inc.: New York, 1988 and in the references therein; and in U.S. Pat. No. 3,117,099.

Some of the aromatic epoxy resin compounds useful in the present invention include for example epoxy compounds based on reaction products of polyfunctional phenols, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of p-aminophenols. Other suitable epoxy compounds known in the art include for example reaction products of epichlorohydrin with o-cresol novolacs, hydrocarbon novolacs, and, phenol novolacs. The epoxy compound may also be selected from commercially available products such as for example, D.E.R. 331®, D.E.R. 332, D.E.R. 354, D.E.R. 580, D.E.N. 425, D.E.N. 431, or D.E.N. 438 epoxy resins available from The Dow Chemical Company.

As aforementioned, the curable liquid carbon precursor composition can be prepared by admixing (a) the at least one aromatic epoxy resin described above with (b)(i) at least one aromatic co-reactive curing agent, or (b)(ii) at least one catalytic curing agent, or (b)(iii) a mixture of the at least one aromatic co-reactive curing agent and the at least one catalytic curing agent.

An "aromatic co-reactive curing agent" herein means an aromatic compound bearing functional groups which react with the epoxide of the aromatic epoxy resin to effect curing and/or polymerization by condensation of the epoxide groups of the aromatic epoxy resin with the functional groups of the aromatic co-reactive curing agent.

A "catalytic curing agent" herein means a compound which reacts with the epoxide group of the aromatic epoxy resin to initiate curing and/or polymerization of the aromatic epoxy resin by epoxide homopolymerization.

The at least one aromatic co-reactive curing agent or the at least one catalytic curing agent of the carbon precursor composition of the present invention can include for example one or a combination of two or more of the above curing agents. The aromatic co-reactive curing agent and the catalytic curing agent of the carbon precursor composition useful in the present invention may be selected from any aromatic co-reactive curing agents or any catalytic curing agents for epoxy resins known in the art.

For example, the aromatic co-reactive curing agent (also referred to as a hardener or cross-linking agent) useful in the present invention may be any aromatic compound having an active group being reactive with the reactive epoxy group of the epoxy resin. The chemistry of such curing agents is described in the previously referenced books on epoxy resins. The aromatic co-reactive curing agent useful in the present invention includes nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, and phenolic-terminated epoxy resins.

In one preferred embodiment, diaminodiphenylsulfone and their isomers, aminobenzoates, various acid anhydrides, phenol-novolac resins and cresol-novolac resins, for example, may be used in the present invention, but the present invention is not restricted to the use of these compounds.

The aromatic co-reactive curing agent of choice may depend on the aromatic epoxy resin used in the formulation. Generally, the aromatic co-reactive curing agent useful in the present invention may be selected from, for example, but are not limited to, phenols, benzoxazines, aromatic anhydrides, aromatic amines, aromatic carbodiimides, aromatic polyesters, aromatic polyisocyanates, and mixtures thereof. In the cases of a divinylarene dioxide used as the aromatic epoxy resin the aromatic co-reactive curing agent can also include a phenol, diphenol, or polyphenol.

In one embodiment, the at least one aromatic co-reactive curing agent may include one or more of aromatic amines such as methylenedianiline (MDA), toluenediamine (TDA), diethyltoluenediamine (DETDA), diaminodiphenylsulfone (DADS), polyphenols such as bisphenol A, bisphenol F, 1,1-bis(4-hydroxyphenyl)-ethane, hydroquinone, resorcinol, catechol, tetrabromobisphenol A, novolacs such as phenol novolac, bisphenol A novolac, hydroquinone novolac, resorcinol novolac, naphthol novolac, anhydrides such as phthalic anhydride, trimellitic anhydride, and mixtures thereof.

In a preferred embodiment, the aromatic co-reactive curing agent blended with the at least one aromatic epoxy resin such as for example a divinylarene dioxide in preparing the curable carbonized composition liquid precursor of the present invention may comprise, for example, any compound adapted for providing a carbon yield of greater than 35 percent when the compound is subjected to carbonization or pyrolysis. In one embodiment, the aromatic co-reactive curing agent adapted for providing a high carbon yield may include for example a phenol such as p-cresol or m-cresol or other phenol, and mixtures thereof. One preferred embodiment includes a phenol compound useful for the curable composition of the present invention, such as for example p-cresol.

Generally, the ratio r of epoxide equivalents from the aromatic epoxy resin to the co-reactive groups of the aromatic co-reactive curing agent adapted for providing a high carbon yield used in the present invention, may be for example, from 0.1 to 10 in one embodiment, from 0.2 to 8 in another embodiment; from 0.4 to 6 in still another embodiment; and from 1 to 5 in yet another embodiment. When r is greater than 1.0, after curing the excess epoxide may remain unreacted or may be reacted into the thermoset network. When the aromatic epoxy resin is a divinylarene dioxide and the aromatic co-reactive curing agent is a phenol, r is defined as explained in co-pending U.S. Provisional Patent Application No. 61/660,397.

The catalytic curing agent useful in the present invention may include, for example, Bronsted acids, Lewis acids, Lewis bases, alkali bases, Lewis acid-Lewis base complexes, quaternary ammonium compounds, quaternary phosphonium compounds, or mixtures thereof. Suitable examples of Bronsted acids include sulfuric acid, sulfonic acids, perchloric acid, phosphoric acid, partial esters of phosphoric acid, and mixtures thereof. One suitable example of a Lewis acid includes boron trifluoride. Suitable examples of Lewis bases include tertiary amines, imidazoles, amidines, substituted ureas and mixtures thereof. One suitable example of an alkali base includes potassium hydroxide. One suitable example of a Lewis acid-Lewis base complex includes boron trifluoride-ethylamine complex. One suitable example of a quaternary ammonium compound is benzyltrimethylammonium hydroxide. One suitable example of a quaternary phosphonium compound is tetrabutylphosphonium hydroxide.

In addition, when an aromatic epoxy resin such as a divinylarene dioxide is used, the catalytic curing agent useful in the present invention can include the latent catalysts described in co-pending U.S. Provisional Patent Application No. 61/660,403.

In preparing the curable liquid carbon precursor composition of the present invention, optional compounds can be added to the curable liquid carbon precursor composition including for example at least one curing catalyst. A "curing catalyst" or "cure catalyst" herein means a compound used to facilitate the reaction of the at least one aromatic epoxy resin with the aromatic co-reactive curing agent compound. The curing catalyst may be selected based on the epoxy resin employed and the aromatic co-reactive curing agent employed in the present invention composition.

In one illustrative embodiment when the epoxy resin is for example a divinylarene dioxide and the curing agent is for example a phenol, the optional curing catalyst useful in the present invention may include at least one acid compound-related cure catalyst to facilitate the reaction of the divinylarene dioxide compound with the phenol. In one embodiment, the catalyst useful in the present invention may include, for example, any one or more of the catalysts described in U.S. Provisional Patent Application Ser. No. 61/556,979, such as for example Bronsted acids (e.g., CYCAT® 600 commercially available from Cytec), Lewis acids, and mixtures thereof. In another embodiment, the catalysts may include for example a latent alkylating ester such as for example, any one or more of the catalysts described in WO 9518168.

In another embodiment, the latent alkylating ester cure catalyst may include for example the esters of sulfonic acids such as methyl p toluenesulfonate (MPTS), ethyl p-toluenesulfonate (EPTS), and methyl methanesulfonate (MMS); esters of α-halogenated carboxylic acids such as methyl trichloroacetate and methyl trifluoroacetate; and esters of phosphonic acids such as tetraethylmethylene-diphosphonate; or any combination thereof. One preferred embodiment of the cure catalyst used in the present invention may include for example MPTS. Other curing catalysts useful in the present invention may include for example those described in co-pending U.S. Provisional Patent Application No. 61/660,397.

Generally, the amount of catalytic curing agent or optional cure catalyst used in the present invention, may be for example, from 0.01 wt % to 20 wt % in one embodiment, from 0.1 wt % to 10 wt % in another embodiment; from 0.1 wt % to 5 wt % in still another embodiment; and from 0.1 wt % to 3 wt % catalyst in yet another embodiment. The use of lower levels of catalytic curing agent or optional cure catalyst would reduce reactivity and would result in less crosslinked network; and the use of higher levels of catalytic curing agent or optional cure catalyst would be uneconomical.

The curable formulation of the present invention may include as an optional compound at least one other second epoxy compound different from the above-described first aromatic epoxy resin such as DVBDO. For example, the second epoxy compound may include one epoxy compound or may include a combination of two or more epoxy compounds. The epoxy compounds useful in the present invention are those compounds may include a wide variety of epoxy compounds known in the art. For example, the epoxy compound may be saturated or unsaturated, aliphatic, cycloaliphatic, aromatic or heterocyclic and may be substituted. The epoxy compound may be monomeric or polymeric.

For example, the formulation of the present invention may include, one or more epoxy compounds known in the art such as epoxy compounds described in Pham, H. Q. and Marks, M. J., *Epoxy Resins*, the Kirk-Othmer Encyclopedia of Chemical Technology; John Wiley & Sons, Inc.: online Dec. 4, 2004; in Lee, H. and Neville, K., *Handbook of Epoxy Resins*, McGraw-Hill Book Company, New York, 1967, Chapter 2, pages 2-1 to 2-33, and in the references therein; May, C. A. Ed., *Epoxy Resins: Chemistry and Technology*, Marcel Dekker Inc.: New York, 1988; and in U.S. Pat. No. 3,117,099.

Some of the epoxy compounds useful as the second epoxy resin may include for example epoxy compounds based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy compounds known in the art include for example reaction products of epichlorohydrin with o-cresol novolacs, hydrocarbon novolacs, and, phenol novolacs. The epoxy compound may also be selected from commercially available products such as for example, D.E.R. 331®, D.E.R. 332, D.E.R. 354, D.E.R. 580, D.E.N. 425, D.E.N. 431, D.E.N. 438, D.E.R. 736, or D.E.R. 732 epoxy resins available from The Dow Chemical Company.

When a single aromatic epoxy resin is used herein, or when an aromatic epoxy resin is used in combination or blend with one or more other non-aromatic, aliphatic, or cycloaliphatic epoxy compounds, the total amount of the epoxy resin used in the formulation useful in the present invention may range generally from 0.5 weight percent (wt %) to 100 wt % in one embodiment, from 1 wt % to 99 wt % in another embodiment, from 2 wt % to 98 wt % in still another embodiment, and from 5 wt % to 95 wt % in yet another embodiment, depending on the fractions of the other ingredients in the reaction product composition.

Other optional compounds that may be added to the curable liquid carbon precursor composition of the present invention may include compounds that are normally used in curable resin formulations known to those skilled in the art. For example, the optional components may comprise compounds that can be added to the composition to enhance application properties (e.g. surface tension modifiers or flow aids), reliability properties (e.g. adhesion promoters) the reaction rate, the selectivity of the reaction, and/or the catalyst lifetime.

Other optional compounds that may be added to the curable liquid carbon precursor composition of the present invention may include, for example, a solvent to lower the viscosity of the formulation even further from the initial viscosity of the composition; other epoxy resins different from the aromatic epoxy resin (e.g., aliphatic glycidyl ethers or cycloaliphatic epoxy resins); other curing agents different from aromatic co-reactive curing agents and catalytic curing agents; fillers; pigments; fibers; toughening agents; flow modifiers; adhesion promoters; diluents; stabilizers; plasticizers; curing catalysts; catalyst de-activators; flame retardants; aromatic hydrocarbon resins; coal tar pitch; petroleum pitch; carbon nanotubes; graphene; carbon black; carbon fibers, or mixtures thereof.

Generally, the amount of the other optional compounds, when used in the present invention, may be for example, from 0 wt % to 90 wt % in one embodiment, from 0.01 wt % to 80 wt % in another embodiment; from 0.1 wt % to 65 wt % in still another embodiment; and from 0.5 wt % to 50 wt % curing agent in yet another embodiment.

One embodiment for preparing the above-described curable high carbon yield low neat viscosity liquid carbon precursor formulation or composition includes, for example the step of admixing (a) at least one aromatic epoxy resin; and (b)(i) at least one aromatic co-reactive curing agent, (b)(ii) at least one catalytic curing agent, or (b)(iii) a mixture thereof; wherein the liquid precursor composition has a neat viscosity of less than 10,000 mPa-s at 25° C. prior to adding optional components, prior to curing, and prior to carbonizing; and wherein the liquid precursor composition being cured has a carbon yield of at least 35 wt % as measured in the absence of optional components; and (c) optionally, at least one cure catalyst or other optional ingredients as desired.

The compounds used in making the curable liquid carbon precursor composition are beneficially low viscosity materials that mix without special effort. For example, the preparation of the curable liquid carbon precursor composition of the present invention is easily achieved by blending the ingredients of the composition with a magnetic stir bar mixer or a pail mixer. For example, the curable liquid carbon precursor composition can be mixed with a standard pail mixer at from 1 rpm to 200 rpm.

The required and optional components or ingredients of the curable liquid carbon precursor composition or formulation of the present invention are typically mixed and dispersed at a temperature enabling the preparation of an effective curable composition having the desired balance of properties for a particular application. For example, the temperature during the mixing of the components may be generally from −10° C. to 100° C. in one embodiment, and from 0° C. to 50° C. in another embodiment. Lower mixing temperatures help to minimize reaction of the resin and hardener components to maximize the pot life of the formulation.

As one illustrative embodiment and not be limited thereby, a divinylbenzene dioxide, a p-cresol, a cure catalyst, and other desirable and optional additives, for example an additional epoxy resin, can be admixed together to form the curable liquid carbon precursor composition of the present invention.

The preparation of the curable liquid carbon precursor composition of the present invention, and/or any of the steps thereof, may be a batch or a continuous process. The mixing equipment used in the process may be any vessel and ancillary equipment well known to those skilled in the art.

The curable liquid carbon precursor composition useful in the present invention, prior to adding any optional compounds, prior to curing, and prior to carbonizing, has a neat viscosity of less than 10,000 mPa-s at 25° C. For example, the curable liquid carbon precursor composition without optional compounds and prior to curing and carbonizing has a neat viscosity of generally less than 10,000 mPa-s in one embodiment, from 1 mPa-s to 10,000 mPa-s in another embodiment, from 1 mPa-s to 5,000 mPa-s in yet another embodiment, from 5 mPa-s to 3,000 mPa-s in still another embodiment, and from 10 mPa-s to 1,000 mPa-s in yet another embodiment, at 25° C. In other embodiments, the neat viscosity of the curable liquid carbon precursor composition prior to curing can include 1 mPa-s or greater, 5 mPa-s or greater, or 10 mPa-s or greater. In other embodiments, the neat viscosity of the curable liquid carbon precursor composition prior to curing can include 10,000 mPa-s or lower, 5,000 mPa-s or lower, 3,000 mPa-s or lower or 1,000 mPa-s or lower.

The above low viscosity formulation (lower than 10,000 mPa-s) can advantageously be used without having to dilute the formulation with a solvent to obtain the low viscosity. In addition, the formulation advantageously shows good affinity to carbon surfaces and ultimately provides a high carbon yield (e.g., higher than 35%). In another embodiment, the process for preparing the carbon-carbon composite is beneficial because the use of the low viscosity formulation reduces the number of densification cycles (typically, by one or more cycles) to deliver a uniformly densified carbon-carbon composite (i.e., a composite with no interphase transition between carbon matrix such as carbon fibers and impregnated resin) as well as a carbon-carbon composite with minimum porosity when densified (typically, above 10 lbs/cubic feet).

One advantage of the low viscosity of the curable liquid carbon precursor composition of the present invention is that the low viscosity enables a processable amount of resin pick-up by the carbon matrix such as carbon fibers.

In addition to having a low viscosity, the curable liquid carbon precursor composition, prior to curing, has a surface tension that can be from 10 mN/m to 70 mN/m at 25° C. in one embodiment, from 20 mN/m to 60 mN/m in another embodiment, and from 30 mN/m to 60 mN/m in still another embodiment. In other embodiments, the surface tension of the curable liquid carbon precursor composition prior to curing can include 10 mN/m or greater, 20 mN/m or greater, or 30 mN/m or greater. In other embodiments, the surface tension of the curable liquid carbon precursor composition prior to curing can include 70 mN/m or lower or 60 mN/m or lower.

Furthermore, the curable liquid carbon precursor composition of the present invention may have a wettability property sufficient to easily and efficiently wet the surface of a carbon substrate or member, that is, the liquid precursor has affinity between a liquid and a surface translating into the ability of the liquid to spread on the surface of the substrate.

Figure 1:
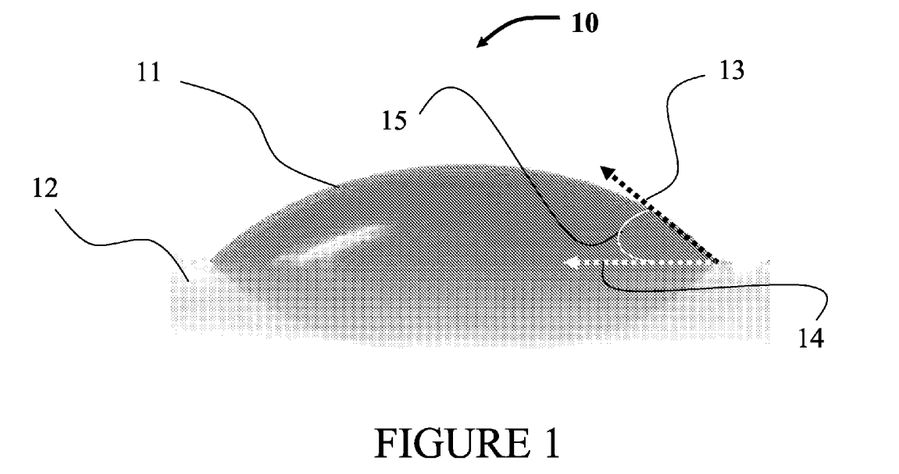
FIG. 1 is a photograph of a liquid droplet of a curable liquid carbon precursor formulation on the surface of a graphite substrate.

For example, in one embodiment with reference to FIG. 1, there is shown a photograph of a droplet reposed on top of a surface of a substrate, generally indicated by numeral 10, including a droplet of the curable liquid carbon precursor composition 11 which has been placed on a flat surface of a graphite substrate 12 at ambient temperature (about 25° C.) to illustrate the wettability of the liquid droplet 11. The contact angle of the droplet is shown by the arrows 13 and 14 and angle 15. As known in the art, the lesser the angle 15, the better the wetting of the substrate surface 12 by the liquid droplet 11.

Generally, the wetting ability, i.e. the wettability, of the curable liquid carbon precursor composition in terms of contact angle on the surface of a substrate, for example of the droplet shown in FIG. 1, can be a minimum of less than 90 degrees, preferably from zero degrees to 90 degrees, more preferably from 5 degrees to 90 degrees, even more preferably from 10 degrees to 60 degrees, and most preferably from 15 degrees to 40 degrees at ambient temperature as measured on the surface of a substrate or a fiber in accordance to the method disclosed in ASTM Method D5725-99. In other embodiments, the contact angle of the curable liquid carbon precursor composition prior to curing can include 0 degrees or greater, 5 degrees or greater, 10 degrees or greater, or 15 degrees or greater. In other embodiments, the contact angle of the curable liquid carbon precursor composition prior to curing can include 90 degrees or lower, 60 degrees or lower, or 40 degrees or lower.

The substrates used in the present invention in which a contact angle may be measured with reference to the liquid composition can vary and may include for example graphite, glass, ceramic, and metals.

The first step of producing a carbon-carbon composite product of the present invention is preparing or providing a curable formulation of the present invention as described above. Upon preparing the above curable formulation as described above, the formulation can be further processed to form a carbon-carbon composite product.

The process of producing a carbon-carbon composite product of the present invention includes the step of contacting at least a portion of a carbon material (i.e. a carbon-rich material) or carbon matrix with the above described curable aromatic epoxy resin liquid formulation. For example, the carbon matrix adapted to be contacted with the curable aromatic epoxy resin liquid formulation of the present invention may include for example carbon fibers, carbon block, graphite block, carbon fiber mats, any solid carbonaceous matrix, porous carbonaceous matrix, a carbonizable carbon reinforcement matrix, and combinations thereof.

The contacting step of the process can include for example impregnating such as by a resin transfer molding (RTM), by a vacuum assisted resin transfer molding, pressure assisted resin transfer molding, or dipping; infiltrating, prepregging; coating such as rolling, spraying, brushing, and pouring; or combinations thereof.

For example, in one embodiment, the curable aromatic epoxy resin liquid formulation as described above, having a low neat viscosity (e.g. a neat viscosity of less than 10,000 mPa-s) and a high graphite affinity, is particularly and advantageously capable of being impregnated into at least a portion of various carbon materials or carbon matrixes for further densification to form other densified carbonized materials depending on the enduse of the final product.

Generally, the wetting ability, i.e. the wettability, of the liquid precursor in terms of contact angle on the surface of a substrate, for example of the droplet shown in FIG. 1, can be a minimum of less than 90 degrees, preferably from zero degrees to 90 degrees, more preferably from 5 degrees to 90 degrees, even more preferably from 10 degrees to 40 degrees, and most preferably from 15 degrees to 35 degrees at ambient temperature as measured on the surface of a substrate or a fiber in accordance to the method disclosed in ASTM Method D5725-99.

The substrates used in the present invention in which a contact angle may be measured with reference to the liquid composition can vary and may include for example graphite, glass, ceramic, and metals.

The process of the present invention can include an optional step of pre-shaping or molding the curable aromatic epoxy resin liquid formulation which has been impregnated into the carbon matrix to form a preform material or precursor. "Pre-shaping" herein means delivering a future carbon-carbon composite composition into a means for providing a shaped material such as for example a solid temporary template, a mold or a support to distribute elements of the future carbon-carbon composite composition into a predetermined position to obtain a specific shape prior to the curing and/or the carbonization steps of the present invention. Elements of the future carbon-carbon composite composition can include for example fillers, fibers, organic or inorganic materials, and pieces of carbon-carbon composites.

In one embodiment, the first step of pre-shaping delivers a green carbon-carbon composite by curing the liquid carbon precursor. The green carbon-carbon composite would be designed to produce a carbon-carbon composite of a desired shape and dimensions. The carbon matrix impregnated with the formulation, in one embodiment, is pre-shaped into a preform of a desired shape and dimensions. In another embodiment, the carbon matrix impregnated with the curable formulation can be pre-shaped into a preform prior to curing the preform. For example, the carbon matrix impregnated with the formulation, prior to the curing and carbonizing steps can be shaped into a rectangular or square article such as when the enduse application of such carbon matrix includes aerospace brake pads. Subsequently, the pre-shaped preform can be cured and carbonized to form an article such as brake pads for airplanes.

In still another embodiment, the cured carbon matrix can be pre-formed or shaped into a desired structure after curing structure and before carbonizing the structure. Once the cured pre-shaped carbon matrix is formed, the cured pre-shape carbon matrix is carbonized to produce a carbonized carbon-carbon composite The process of the present invention includes the step of curing the aforementioned curable liquid carbon precursor composition to form a cured material or cured product. The curing of the curable liquid carbon precursor composition may be carried out at a predetermined temperature and for a predetermined period of time sufficient to cure the liquid carbon precursor composition. For example, the temperature of curing the curable liquid carbon precursor composition or formulation may be generally from 10° C. to 350° C. in one embodiment; from 25° C. to 200° C. in another embodiment, from 100° C. to 190° C. in still another embodiment; and from 125° C. to 175° C. in yet another embodiment. In other embodiments, the temperature of curing can include 10° C. or greater, 25° C. or greater, 100° C. or greater, or 125° C. or greater. In other embodiments, the temperature of curing can include 350° C. or lower, 200° C. or lower, 190° C. or lower, or 175° C. or lower.

Generally, the curing time for curing the curable liquid carbon precursor composition or formulation may be chosen between 1 minute to 90 days in one embodiment, 2 minutes to 7 days, 3 minutes to 1 day, 5 minutes to 8 hours, to between 7 minutes to 4 hours in another embodiment, and between 10 minutes to 2 hours in still another embodiment. In other embodiments, the time of curing can include 1 minute or greater, 2 minutes or greater, 3 minutes or greater, 5 minutes or greater, 7 minutes or greater, or 10 minutes or greater. In other embodiments, the time of curing can include 90 days or lower, 7 days or lower 1 day or lower, 8 hours or lower, 4 hours or lower, or 2 hours or lower.

The divinylarene dioxide of the present invention such as DVBDO, which is one embodiment of the epoxy resin component of the curable composition of the present invention, may be used as the sole resin to form the epoxy matrix in the final curable liquid carbon precursor composition or formulation; or the divinylarene dioxide resin may be used in combination with another epoxy resin that is different from the divinylarene dioxide as the epoxy component in the final curable liquid carbon precursor composition or formulation.

Upon curing the curable liquid carbon precursor composition having a neat viscosity of less than 10,000 mPa-s at 25° C., the resultant cured composition is adapted for being carbonized or further processed. Upon curing the curable liquid carbon precursor composition, the cured composition comprises a solid body which can be formed or shaped into a desired preform structure before carbonizing the structure.

One of the beneficial consequences of producing the cured material from curing the curable liquid carbon precursor composition described above includes producing a cured product having a carbon yield of generally at least 35 wt %. For example, the carbon yield of the cured product, as measured by thermogravimetric analysis (TGA), generally may be from 35 wt % to 95 wt % in one embodiment, from 40 wt % to 90 wt % in another embodiment, from 45 wt % to 85 wt % in still another embodiment, or from 50 wt % to 80 wt % in yet another embodiment, based on the total weight of the cured composition. In other embodiments, the carbon yield of the cured product can include 35 wt % or greater, 40 wt % or greater, 45 wt % or greater, or 50 wt % or greater. In other embodiments, the carbon yield of the cured product can include 95 wt % or lower, 90 wt % or lower, 85 wt % or lower, or 80 wt % or lower.

The resulting cured material (i.e., the cross-linked product) produced from curing the curable liquid carbon precursor composition described above forms a cured preform precursor that can be carbonized in accordance with the present invention to further form a carbonized composition or carbonized product with several improved properties over conventional epoxy resins which have been cured and carbonized.

In one embodiment, the curing step described above can be carried out concurrently with the carbonizing step in whole or in part. In another embodiment, the carbonizing step can be carried out as a separate step from the curing step.

For example, the process of the present invention can include the step of carbonizing the cured material in an inert atmosphere such as nitrogen or vacuum at a predetermined temperature and for a predetermined period of time sufficient to carbonize the cured material and provide a carbonized composition having a carbon yield of greater than 35 wt %. For example, the temperature of carbonizing the cured material may be generally from 350° C. to 4,000° C. in one embodiment; from 400° C. to 3,500° C. in another embodiment; from 500° C. to 3,000° C. in still another embodiment; and from 800° C. to 2000° C. in yet another embodiment.

Generally, the time of carbonizing the cured material may depend on the amount of carbon material, the size of the carbon article, and the complexity of the carbon article. In one illustrative embodiment, the time of carbonizing the cured material can be chosen for example in the range from 1 minute to 90 days in one embodiment, from 30 minutes to 7 days in another embodiment, and from 1 hour to 24 hours in still another embodiment.

Carbonizing the cured material as described herein above provides a carbonized composition or carbonized product having several advantages over the prior art. For example, one advantage of the carbonized composition of the present invention is that the carbonized composition has a low amount of impurities. The impurities can include for example metals and non-metals. The presence of impurities in the carbonized composition may introduce deleterious effects in the properties of the resulting carbonized material in its various applications and therefore the impurities in the carbonized product should be avoided.

After contacting (e.g., infiltration or impregnation) for example a carbonizable carbon reinforcement matrix with the curable and carbonizable liquid formulation; curing the infiltrated or impregnated matrix; and carbonizing the cured matrix; any number of optional heat treatments; and/or further fabrication methods may be employed to form the carbon-carbon composite of the present invention.

Figure 2:
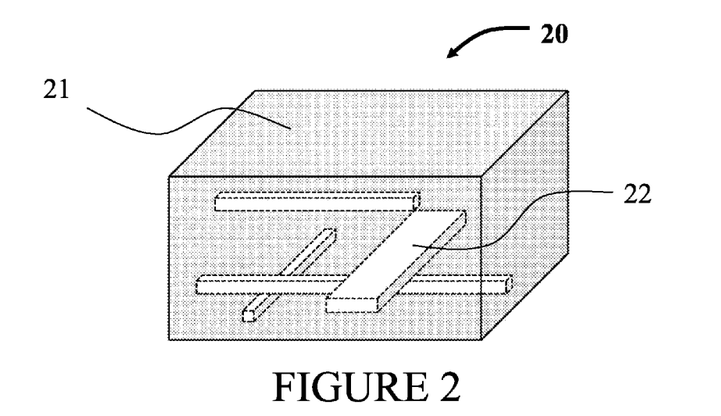
FIG. 2 a schematic illustration of a carbon matrix with voids, i.e., a carbon matrix with the absence of impregnated liquid formulation and/or cured liquid formulation.
Figure 3:
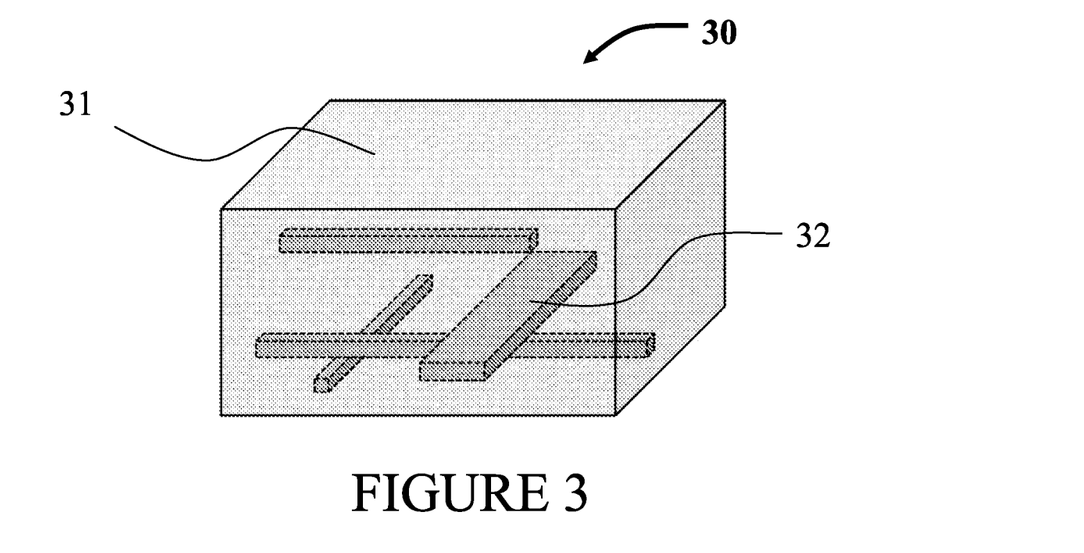
FIG. 3 is a schematic illustration of a carbon-carbon composite including a carbon matrix impregnated with liquid formulation and/or cured formulation, i.e., the voids of the carbon matrix are filled with impregnated liquid formulation and/or cured liquid formulation.
Figure 4:
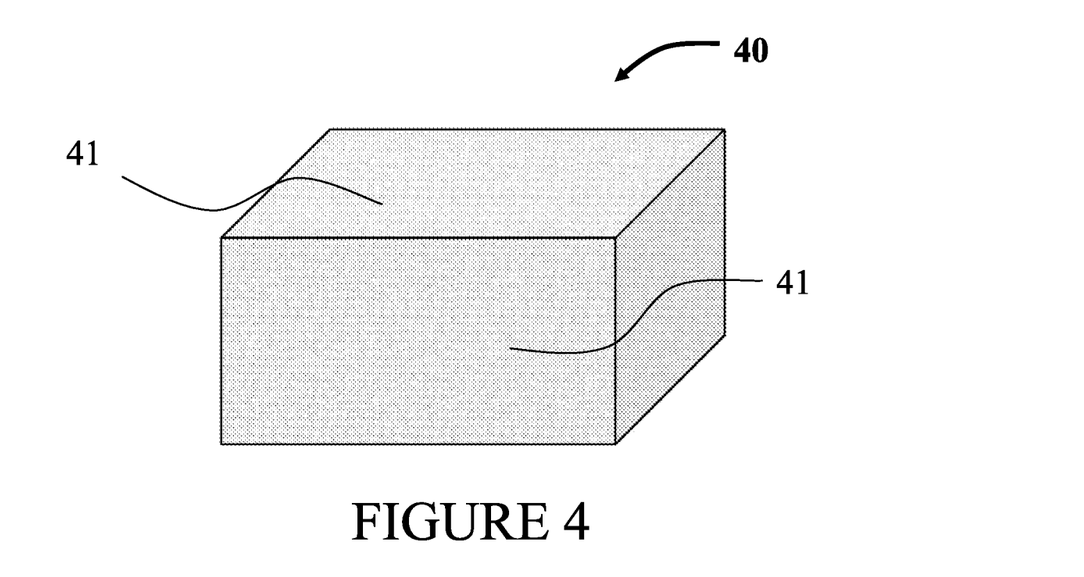
FIG. 4 is a schematic illustration of a carbonized carbon-carbon composite including a carbon matrix with a carbon-carbon composite material, resulting from curing and carbonization the impregnated resin and resulting in a densified carbon-carbon composite.

For example, with reference to FIG. 2-4 there are shown schematic illustrations successive resin blocks following each of the processing steps in sequential order for manufacturing a carbon-carbon composite. Beginning with FIG. 2, there is shown, for example, a carbon matrix 21 with voids 22 and wherein such carbon matrix is generally indicated by numeral 20. In other words, the carbon matrix 20 shown in FIG. 2, has an absence of impregnated liquid formulation and/or cured liquid formulation, voids or empty space 22, as shown in FIG. 2 by dotted lines 22.

With reference to FIG. 3, there is shown a second processing step following the step of FIG. 2 wherein a carbon-carbon composite, generally indicated by numeral 30, includes a carbon matrix 31 which has been impregnated with a liquid formulation and/or a cured formulation 32. In other words, FIG. 3 illustrates that the previous empty space or voids 22 in the body of the carbon matrix 20 are now filled with impregnated liquid formulation and/or cured liquid formulation 32 as shown in FIG. 3 in solid lines.

With reference to FIG. 4, there is shown a second processing step following the step of FIG. 3 wherein a carbonized carbon-carbon composite, generally indicated by numeral 40, including a carbon matrix with a carbon-carbon composite material, resulting from curing and carbonization the impregnated resin 32 in the carbon matrix 31 of FIG. 3, resulting in a densified carbon-carbon composite 41.

Some of the properties of the compositions of the present invention may include for example the level of impurities in the curable formulation, the cured composite and the carbonized composite; and the microstructure nature, the chemical stability, the inertness, the tensile strength, the flexural strength, the Young's modulus, the strain at failure, the electrical conductivity, the thermal conductivity, and the thermal expansion of the composite.

The carbon yield of the cured impregnated liquid precursor composition can be measured by Thermogravimetric Analysis (TGA). Generally, the carbon yield of the cured impregnated liquid precursor composition may be from 35 wt % to 95 wt % as aforementioned.

While there are no known comparable conventional epoxy resin systems to compare the system of the present invention, there are known conventional phenolic-based formulations that are processed with solvent of at least 15 wt % in a high solid version achieving viscosities higher than 15,000 mPa-s and that are unsuitable for the process of the present invention.

Figure 5:
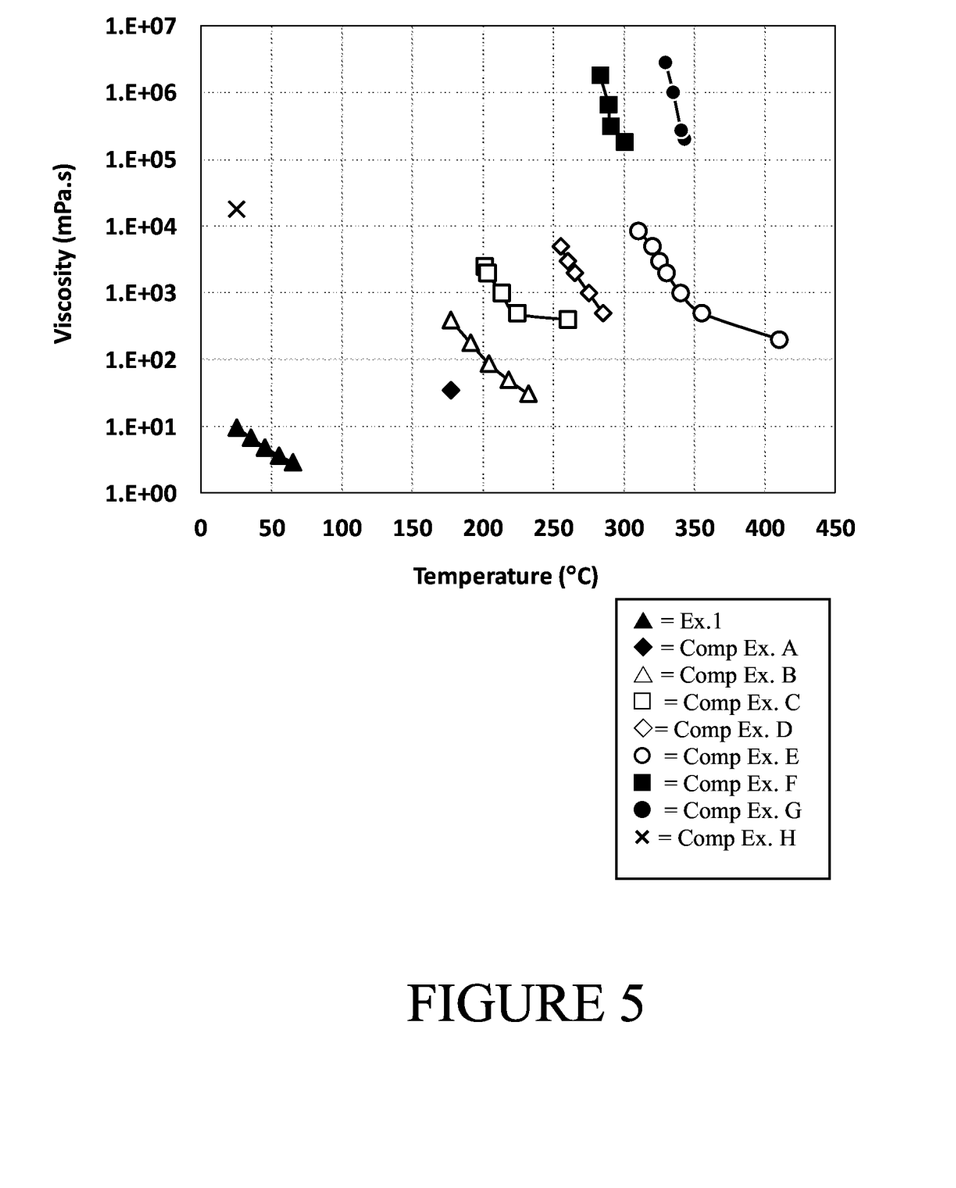
FIG. 5 is a graphical illustration showing the viscosity of carbon precursors at various temperatures at which such so-called carbon precursors are in liquid form.

FIG. 5 shows the viscosity of carbon precursors at the various temperatures at which the so-called carbon precursors are liquid. Ashland A170 (♦) and Ashland A240 (Δ) [Comparative Examples A and B, respectively] are petroleum pitches from Ashland Petroleum Co., Ashland Petroleum Co., Kentucky reported by Harry Marsh, lsao Mochida, Ernest Scott and Janet Sherlock in Fuel, 1980, Vol 59, July p. 517. Viscosities of Aerocarb 60® (□), Aerocarb 70® (◊) and Aerocarb 80® (○) [Comparative Examples C, D and E, respectively] which are pitches from Ashland Petroleum Co. are reported by U.S. Pat. No. 6,706,401 (B1) as well as viscosities of AR Mesophase® (■) and AR-120

Mesophase® (●) [Comparative Examples F and G], respectively which are pitches from Mitsubishi Gas Co., Japan. Viscosity of 85% solid (15% solvent by weight is IPA) commercial phenolic resin product labeled as "SC-1008 VHS" (X) [Comparative Example H] from Momentive has been reported in the technical data sheet of the product (www.momentive.com). Liquid carbon precursor of the present invention (▲) [Example 1] was measured on a torsional rheometer as described in subsequent paragraph. FIG. 5 shows examples of carbon precursors from the literature demonstrating that most of prior art carbon precursors are solid below 150° C. or show a viscosity higher than 10,000 mPas-s even with the addition of 15% in weight of isopryl alcohol such as SC1008VHS.

The carbon-carbon composite of the present invention may be used to manufacture various carbon-carbon composite articles such as airplane brake pads, discs and other friction materials, insulation materials, conductive materials, and corrosion resistance materials, refractory structures, and aircraft engine components.

EXAMPLES

The following examples and comparative examples further illustrate the present invention in detail but are not to be construed to limit the scope thereof.

Various terms and designations used in the following examples are explained herein as follows:

"DVBDO" stands for divinylbenzene dioxide.
"MPTS" stands for methyl p-toluenesulfonate.
"TGA" stands for thermogravimetric analysis.

The following standard analytical equipments and methods are used in the Examples:

Measurement of Density

The higher the quality of the carbon, the higher the density of the carbon. With a higher density, the properties of the resultant carbonized product composite are improved such as increased durability at a higher temperature, increased thermal and electrical conductivity, and increased structural strength. Generally, the density of the carbon-carbon composite may be from 0.01 g/cm$^3$ to 3 g/cm$^3$. The density of a carbonized product can be characterized using a pycnometer.

Measurement of Viscosity

The viscosity of the formulation was measured on a torsional rheometer TA Instruments AR2000 equipped with a 50 mm diameter smooth stainless steel upper plate and a bottom Peltier plate assembly controlling both the temperature of the liquid sample and the normal force acting on the surface of the Peltier plate. About 2 mL of the formulation was deposited on the bottom plate before the top plate was lowered onto the liquid formulation until a gap of 300 microns between the two plates was achieved. The top plate was then rotated at a nominal rate of 0.001 rad/s while the temperature of the bottom plate was raised from 25° C. to 65° C. at a rate of 10° C./min Viscosity was automatically calculated by the TA software and reported a function of the temperature.

Measurement of the Surface Tension

A Calm Dynamic Contact Angle Analyzer was used to measure the surface tension of the liquid. A "Wilhelmy" glass plate cleaned five time with the oxidizing blue flame of a propane torch was used. The method used was the "Read Weight/Time until Weight Stable" step at the ZDOI (Zero Depth Of Immersion) position. The attractive force of the liquid onto the Wilhelmy glass plate was automatically translated by the Calm software as a surface tension.

Measurement of Carbon Yield

Carbon yield (% C) of the cured formulation was determined by thermogravimetric analysis under nitrogen using a TA Instruments Q5000 Thermogravimetric Analyzer with a temperature ramp of 10° C./minute from 25° C. to 1,000° C. The "% C" is defined as the wt % residue at the completion of the above analysis.

Measurement of Porosity

The porosity of the resultant carbonized composite may be measured by flowing an inert gas such as helium through the composite or a liquid such as isopropanol, water or kerosene. For example, for helium measurements a pycnometer may be used. Generally, the porosity of the composite may be from 0.1 percent void volume to 99 percent void volume, based on the total volume of the composite where % porosity can be calculated using the formula:

$$\% \text{ porosity} = \frac{\text{weight of liquid absorbed by the foam}}{\text{density of liquid absorbed} \times \text{volume of foam}}$$

Example 1

In this Example 1, bulk porous graphite is densified in accordance with the process of the present invention. The density of a cubic shape block of graphite (the block having dimensions of 12 mm width by 25 mm long by 5 mm thick) is first characterized using a pycnometer. The block is then dipped in a solution of liquid carbon precursor containing DVBDO/p-cresol/MPTS at ratio 87/12/1 for 24 hours. The viscosity of the formulation is about 12 mPa-s. The high affinity or wettability of the liquid carbon precursor with graphite surface combined with its very low viscosity allows for good penetration of the liquid carbon precursor into the pores of the bulk graphite.

The resultant imbibed graphite block is then baked in an aluminum mold with an excess of resin to make sure the entire volume of the cube cures in the presence of the resin. A typical cure schedule is described in the following table:

| Temperature (° C.) | 60 | 80 | 100 | 110 | 120 | 130 | 140 | 150 | 160 | 175 | 200 | 220 |
|---|---|---|---|---|---|---|---|---|---|---|---|---|
| Time (minutes) | 15 | 15 | 30 | 15 | 15 | 15 | 15 | 15 | 15 | 15 | 15 | 15 |

A composite part is then made from the above cured block by machining to remove the cured epoxy from the cured block's faces to form a specimen for further processing; and the density of the specimen is measured with a pycnometer and compared to the ratio weight by volume of the specimen.

The carbon yield of the cured composition is >62 wt %.

Next the cured specimen is carbonized at 1° C./minute up to 1,000° C. in nitrogen. The density of the resulting carbonized cube is then measured with a pycnometer and compared to the ratio of the volume by the weight of the carbonized specimen. The extent of the densification is revealed by the density increase of the porous graphite. Porosity of bulk graphite varies from 1.5 to 2.2 g/cc depending on the commercial grade (e.g. Graphtek GR125 is an extruded graphite of density 1.55 g/cc and a porosity of 24% whereas Graphtek GM-11 is an isostatically pressed graphite of density 1.87 g/cc and a porosity of 8% as disclosed in the following website: www.graphtekllc.com/grades (2012).

One densification cycle by immersion driven essentially by capillary forces achieves typically a 50% reduction of the pre-existing porosity and therefore increasing the viscosity from 1.6 g/cc to 1.65 g/cc or higher.

Another important property of a carbon-carbon composite is its thermal conductivity which can be related to the extent of the filling of the pores within the graphite block. The quality of the filling of the pores can be examined in cross section views of the graphite blocks. Cross sectional pictures taken by a scanning electron microscope or a transmission electron microscope can reveal for example the internal filling of the pores and show good wall coverage of the pores; and size reduction of the pores or complete filling of the pores.

Example 2

In this Example 2, a carbon-carbon composite is fabricated starting from dry carbon fibers and a liquid carbon precursor in accordance with the process of the present invention as follows: First a square patch of woven carbon fiber fabric about 10 cm in dimension is placed at the bottom of an aluminum pan. Liquid carbon precursor, as described in Example 1, is then slowly poured onto the patch until the liquid precursor completely wets the carbon fabric patch. A second carbon fabric patch is then applied on top of the first patch and then liquid carbon precursor is slowly poured onto the top of the second patch. Another carbon fabric patch is then placed on top of the second patch and the step of pouring the liquid carbon precursor onto the top of the patch is repeated. The procedure of stacking a carbon fiber fabric patch and pouring liquid carbon precursor is repeated until 7 or 8 layers are stacked together. The carbon fabric layered structure is then slowly pressed in a compression molder under moderate pressure to reduce gap spaces between fabric patches. The resultant compressed assembly is then baked in an oven following the curing schedule described in the following table:

| Temperature (° C.) | 60 | 80 | 90 | 100 | 105 | 110 | 115 | 120 | 150 | 200 | 225 |
|---|---|---|---|---|---|---|---|---|---|---|---|
| Time (min) | 30 | 30 | 30 | 30 | 30 | 30 | 30 | 30 | 30 | 60 | 60 |

The cured assembly forms a so-called green carbon-carbon composite composed of carbon fiber and cured epoxy resin. The cured assembly is then cut in smaller elements of about 10 mm wide. The individual elements are then carbonized in a tube furnace at a rate of 1° C./minute up to 1,000° C. in a nitrogen atmosphere. The carbon yield of the cured composition is >62 wt %.

The resultant individual carbon-carbon composite elements thus made can be characterized by their density, thermal conductivity and mechanical resistance to failure. For example, the density of the individual carbon-carbon composite elements can be measured on a pycnometer. The thermal conductivity of the carbon-carbon composites can be related to the integrity or absence of voids in the carbon matrix between fibers. Examination of the matrix can be done by cross section of the carbon-carbon composite and then analysis of the presence and the frequency of internal voids in the carbon-carbon composite matrix. Moreover, the structural strength of the carbon-carbon composite can be evaluated through tensile or flexural testing. A highly dense and compact matrix would result in a tough carbon-carbon composite with high shear strength.

Example 3

In this Example 3, a carbon-carbon composite is densified using a liquid carbon precursor formulation of Example 1. A 10 mm side and 4 mm thick coupon of carbon-carbon composite composed of woven carbon fabric bonded by a carbon matrix is placed in a glass flask. The first step is to pull a slight vacuum from the flask with the carbon-carbon coupon sitting at the bottom of the flask. Liquid precursor is then injected in the glass flask by aspiration from the vacuum until the carbon-carbon coupon is fully immersed in the liquid carbon precursor. The vacuum is then broken and a resulting impregnated carbon-carbon coupon is recovered.

In a next step, the container containing the coupon immersed in liquid carbon precursor is place in a pressurized chamber. Pressures of at least 10 MPa applied to the immersed coupon for at least an hour to promote further penetration of the precursor into the pores of the carbon-carbon composite. The impregnated coupon is then baked according to the following schedule:

| Temperature (° C.) | 60 | 80 | 90 | 100 | 105 | 110 | 115 | 120 | 150 | 200 | 225 |
|---|---|---|---|---|---|---|---|---|---|---|---|
| Time (min) | 30 | 30 | 30 | 30 | 30 | 30 | 30 | 30 | 30 | 60 | 60 |

The resulting cured impregnated carbon-carbon composite coupon is then carbonized in a tube furnace at a rate of 1° C./minutes up to 1,000° C. in a nitrogen atmosphere. The carbon yield of the cured composition is >62 wt %.

The density of the carbon-carbon composite thus made can be measured on a pycnometer. A successful densification would increase the density of the carbon-carbon composite after carbonization. The quality of the impregnation is related to the extent of the filling of the pores within the carbon-carbon composite. A good impregnation and reduction of voids in the carbon-carbon composites would be revealed by examining a cross section of the carbonized carbon-carbon composite using a scanning electron microscope or a transmission electron microscope.

The invention claimed is:
1. A process for preparing a carbon-carbon composite comprising the steps of:
    (I) providing a liquid carbon precursor formulation comprising (a) at least one aromatic epoxy resin comprising a divinylarene dioxide; and (b)(i) at least one aromatic co-reactive curing agent, (b)(ii) at least one catalytic curing agent, or (b)(iii) a mixture thereof; wherein the liquid precursor composition has a neat viscosity of less than 10,000 mPa-s at 25° C. prior to adding optional components, prior to curing, and prior to carbonizing;

and wherein the liquid precursor composition being cured has a carbon yield of at least 35 weight percent disregarding the weight of the carbon matrix and any optional components present in the composition;

(II) contacting a carbon matrix with the liquid formulation of step (I) to form a contacted carbon matrix;

(III) curing the formulation of step (I) contacted to the carbon matrix of step (II) to form a cured contacted carbon matrix (also referred to as a "green carbon-carbon composite"); wherein the cured formulation contacted to the carbon matrix has a carbon yield of at least 35 wt % disregarding the weight of the carbon matrix and any optional components present in the composition; and (IV) carbonizing the cured contacted carbon matrix of step (III) to form a carbon-carbon composite.

2. The process of claim 1, wherein the contacting step (II) includes impregnating, infiltrating, prepregging; coating by rolling, spraying, brushing, or pouring; or combinations thereof.

3. The process of claim 1, including the step of pre-shaping the contacted carbon matrix after step (II) and/or after step (III).

4. The process of claim 1, wherein the process is carried out in the absence of a solvent.

5. The process of claim 1, wherein the liquid carbon precursor formulation, prior to adding optional components, prior to curing, and prior to carbonizing, has a neat viscosity of from 1 mPa-s to 10,000 mPa-s, at 25° C.

6. The process of claim 1, wherein the divinylarene dioxide comprises divinylbenzene dioxide.

7. The process of claim 1, wherein the curing agent of the liquid carbon precursor formulation comprises a phenolic compound; and wherein the phenolic compound comprises a monophenol, a diphenol, a polyphenol, or mixtures thereof.

8. The process of claim 7, wherein the monophenol comprises para-cresol.

9. The process of claim 1, wherein the liquid carbon precursor formulation includes (c) at least one curing catalyst.

10. The process of claim 1, wherein the liquid carbon precursor formulation includes an additional epoxy resin different from the aromatic epoxy resin, an additional curing agent different from the aromatic co-reactive curing agent and the catalytic curing agent, a filler, a reactive diluent, a flexibilizing agent, a processing aide, a toughening agent, or a mixture thereof.

11. The process of claim 1, wherein contacting step (II) is carried out a temperature from −10° C. to 100° C.; wherein the curing step (III) is carried out a temperature from 10° C. to 350° C.; and wherein the carbonizing step (IV) is carried out a temperature from 350° C. to 4,000° C.

12. The process of claim 1, wherein the carbon matrix comprises a porous carbon matrix; and wherein the porous carbon matrix comprises a fiber, a woven cloth, or a bulk solid carbonaceous material.

13. The process of claim 1, wherein the carbon matrix comprises a carbon fiber, a carbon block, a graphite block, a carbon fiber mat, a solid carbonaceous matrix, or combinations thereof.

14. A carbon-carbon composite article prepared by the process of claim 1.

15. The carbon-carbon composite article of claim 14 comprising a brake pad.

16. The carbon-carbon composite article of claim 14, wherein the density of the composite article is greater than 0.01 g/cm$^3$.

* * * * *